United States Patent Office 2,782,134
Patented Feb. 19, 1957

2,782,134

IMPREGNATED DIELECTRIC MATERIAL

William J. Musgrave, Winnetka, Ill., assignor to John E. Fast & Co., an Illinois corporation No Drawing. Application June 30, 1953,
Serial No. 365,231

4 Claims. (Cl. 117—154)

This invention relates to chemical dielectric compounds capable of impregnating paper for use as an electric insulator, paper impregnated therewith, and electric capacitors containing said compounds.

In preparing electric capacitors or condensers it is customary to provide metal electrodes separated by dielectric materials. In a common form of capacitor sheets of metal foil such as aluminum or tin are separated by sheets of paper impregnated with a chemical compound having dielectric properties. However, when an electric charge is placed on the capacitor a reaction often occurs between the dielectric compound and the paper so that the device fails. This problem is especially serious with new devices as the initial failures are often quite numerous, thereby resulting in a high percentage of rejects.

With this invention these failures are materially reduced and the capacitor is ordinarily given a much longer life. This is accomplished by associating with the dielectric compound an inhibitor which is either phenyl beta-naphthylamine or paraphenylenediamine. Either of these inhibitors is preferably dissolved or otherwise associated with the chemical dielectric compound before the compound is used to impregnate the paper. The inhibitor has been found to be particularly useful with liquid polyisobutylene impregnants.

One of the features of this invention, therefore, is to provide a chemical dielectric compound capable of impregnating paper for use as an electric insulator with the compound containing a small proportion of an inhibitor of the class consisting of phenyl beta-naphthylamine and paraphenylenediamine. Another feature is to provide a liquid polyisobutylene containing a small proportion of a phenyl beta-naphthylamine or paraphenylenediamine dissolved therein. A further feature of the invention is to provide paper impregnated with a chemical dielectric compound containing a small proportion of an inhibitor of the class consisting of phenyl beta-naphthylamine and paraphenylenediamine. Yet another feature of the invention is to provide an electric capacitor comprising metal electrodes and a dielectric comprising a chemical compound containing a small proportion of an inhibitor of the class consisting of phenyl beta-naphthylamine and paraphenylenediamine. A particular feature of the invention is to provide an electric capacitor comprising a pair of electrodes and a dielectric between said electrodes comprising a paper spacer impregnated with a polyisobutylene liquid at ordinary room temperature and containing at least 0.5 to 2.0% by weight of an inhibitor of the class consisting of phenyl beta-naphthylamine and paraphenylenediamine dissolved therein.

In one method of preparing a capacitor one of the inhibitors is dissolved in hot liquid polyisobutylene that is preferably heated to a temperature just below that which harms the paper. This temperature, which is preferably 130° C., promotes the solution of the inhibitor in the dielectric compound. After the small proportion of inhibitor has been dissolved, the paper wrapped capacitor, which had been dried under vacuum at a high temperature is then immersed in the heated polyisobutylene and the capacitor is left therein for from 8 to 24 hours in order to insure complete saturation. The capacitor is then removed from the hot polyisobutylene, the excess solution is removed and the capacitor is sealed in the ordinary manner in an impervious coating.

In a particular method of preparing capacitors the inhibitor was dissolved in liquid polyisobutylene heated at 130° C. and a number of paper wrapped capacitors were dried under vacuum in a tank at 130° C. to remove entrapped gases and moisture. The heated liquid polyisobutylene containing the dissolved inhibitor was then run into the tank so that the capacitors were immersed in the polyisobutylene. The capacitors were left immersed in the polyisobutylene at 130° C. for about 15 hours. At the end of this time the capacitors were removed and freed from the excess solution. The capacitors were then sealed in a waterproof coating in the customary manner. These capacitors showed a very small proportion of failures not only when first tested but also on continued life tests.

In all cases the inhibitors of this invention did not adversely affect the resistivity and power factors of the capacitors. In many cases these characteristics were actually improved.

The inhibitor is used in small amounts with the maximum being not greater than that required to completely saturate the liquid polyisobutylene. The amount that is used is preferably at least 0.25% by weight of the chemical dielectric compound and is preferably between 0.5 to 2.0%. In the case of phenyl beta-naphthylamine the amount used with polyisobutylene is preferably between 0.25 and 2.0% by weight of the polyisobutylene. With paraphenylenediamine this amount is preferably between 0.5 and 1.0%.

While I have shown and described certain embodiments of my invention, it is to be understood that it is capable of many modifications. Changes, therefore, in the construction and arrangement may be made without departing from the spirit and scope of the invention as disclosed in the appended claims.

I claim:
1. A dielectric material adapted to be subjected to an electric field comprising paper impregnated with a dielectric compound including a polyisobutylene that is liquid at ordinary room temperature and a small proportion of a compound of the class consisting of phenyl beta-naphthylamine and paraphenylenediamine to inhibit destructive chemical reaction between said paper and said polyisobutylene when subjected to said field.

2. A dielectric material adapted to be subjected to an electric field comprising paper impregnated with a dielectric compound including a polyisobutylene that is liquid at ordinary room temperature and at least 0.25% by weight of the dielectric compound of a compound of the class consisting of phenyl beta-naphthylamine and paraphenylenediamine to inhibit destructive chemical reaction between said paper and said polyisobutylene when subjected to said field.

3. A dielectric material adapted to be subjected to an electric field comprising paper impregnated with a dielectric compound including a polyisobutylene that is liquid at ordinary room temperature and a small proportion of phenyl beta-naphthylamine to inhibit destructive chemical reaction between said paper and said polyisobutylene when subjected to said field.

4. A dielectric material adapted to be subjected to an electric field comprising paper impregnated with a dielectric compound including a polyisobutylene that is liquid at ordinary room temperature and a small proportion of paraphenylenediamine to inhibit destructive chemical reaction between said paper and said polyisobutylene when subjected to said field.

References Cited in the file of this patent

UNITED STATES PATENTS

| | | |
|---|---|---|
| 1,594,982 | Somerville | Aug. 3, 1926 |
| 1,950,438 | Carothers et al. | Mar. 13, 1934 |
| 2,274,031 | Bannon | Feb. 24, 1942 |
| 2,443,974 | Atkinson | June 22, 1948 |
| 2,462,123 | Nelson | Feb. 22, 1949 |
| 2,510,847 | Wilson | June 6, 1950 |
| 2,615,955 | McLean | Oct. 28, 1952 |